Oct. 27, 1964   J. F. JONES   3,153,859
COMBINATION SCALE FOR ROOF FRAMING
Filed Sept. 8, 1961   2 Sheets-Sheet 1
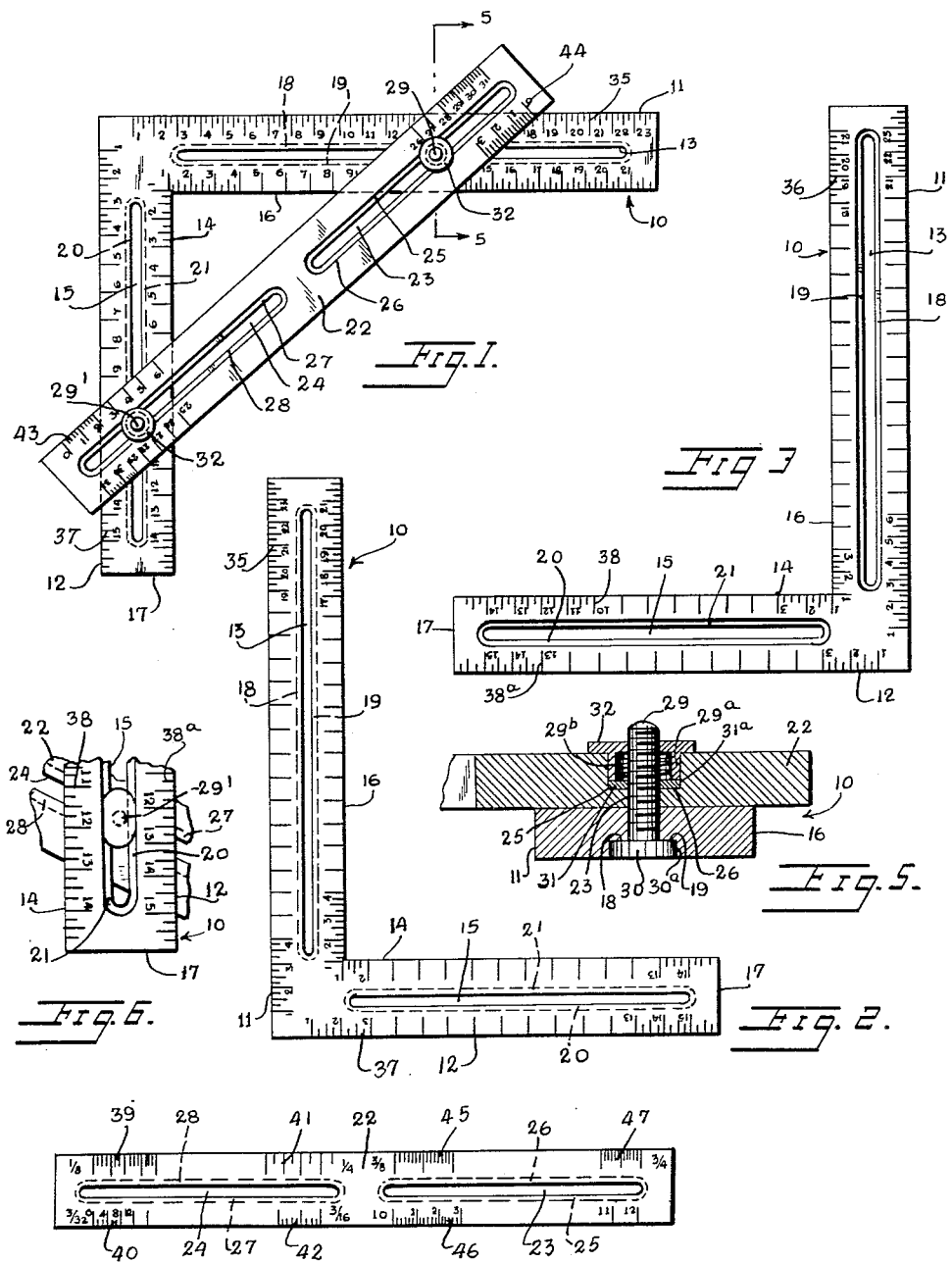
INVENTOR.
JOHN F. JONES
BY
ATTORNEY Oct. 27, 1964    J. F. JONES    3,153,859
COMBINATION SCALE FOR ROOF FRAMING
Filed Sept. 8, 1961    2 Sheets-Sheet 2
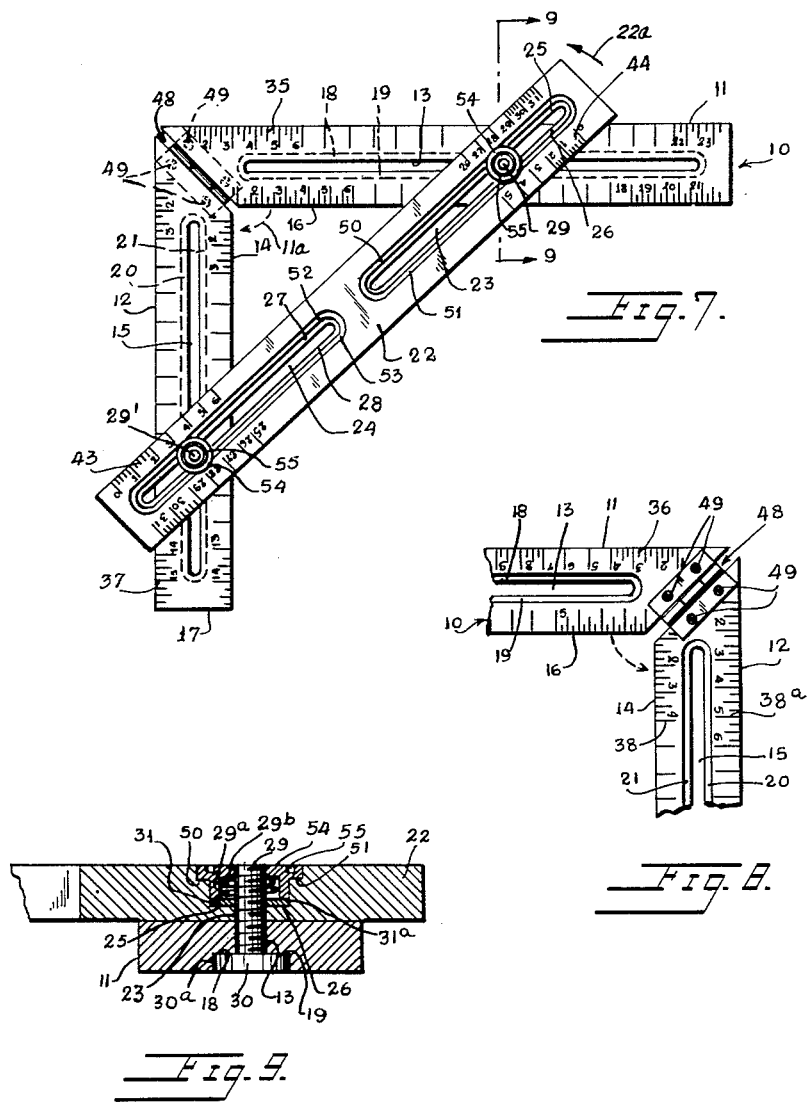
INVENTOR.
JOHN F. JONES

United States Patent Office 3,153,859
Patented Oct. 27, 1964

3,153,859
COMBINATION SCALE FOR ROOF FRAMING
John F. Jones, 1688 E. 48th St., Brooklyn, N.Y.
Filed Sept. 8, 1961, Ser. No. 136,883
1 Claim. (Cl. 33—94)

This invention relates to a combination square and adjustable angle defining rule for framing roofing and stair construction parts.

One of the objects of the invention is to provide a square with longitudinal slots in the angular arms thereof, a rule having a longitudinal slot on opposite sides of the center thereof, and a clamping screw for securing the rule in various angular positions on the arms of the square, so that the scale may be shifted on the square to establish a large number of angles, and be maintained at its adjusted position.

Another object of the invention is the provision of a square having longitudinal slots in its angular arms, a scale disposed on the arms of the square and having longitudinal slots on opposite sides of the center thereof, a screw adjustable in slots of the scale and the square, and a nut threaded on each screw to clamp the same and which is provided with a coil spring for maintaining a variable friction pressure against the engaging scale and square.

A still further object of the invention is to provide a collapsible square with longitudinal slots in the angular arms thereof, a rule having a longitudinal slot on opposite sides of the center thereof, and a removable clamping screw for securing the rule in various angular positions on the arms of the square, one of said angular arms being foldable under the other of said angular arms and the rule being rotatable back upon one of said angular arms whereby to provide a compact, portable unit.

A still further object of the invention is to provide a collapsible square with longitudinal slots in the angular arms thereof, a rule having a longitudinal slot on opposite sides of the center thereof, a pair of screws adjustable in slots of the scale and the square, and a nut threaded on each screw to clamp the same and which is provided with a coil spring for maintaining a variable friction pressure against the engaging scale and square, the scale being provided with shoulders to receive the nut whereby to permit the outer face of the nut to be flush with the outer surface of the scale.

A still further object of the invention is to provide a combination tool which can be used by any person skilled in designing and erecting roofs and stairs, to quickly and accurately lay out many member of a roof construction or any member of a stair construction.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a plan view showing the combined square and scale.

FIG. 2 is a plan view showing one side of the square.

FIG. 3 is a plan view showing the bottom side thereof.

FIG. 4 is a plan view view showing the reverse side of the scale.

FIG. 5 is an enlarged vertical sectional view, taken through the clamping screw and nut.

FIG. 6 is a detail enlarged plan view of a washer and screw unit.

FIG. 7 is a plan view showing a modified form of the present invention.

FIG. 8 is a fragmentary plan view showing the other side of the square shown in FIG. 7.

FIG. 9 is a vertical sectional view taken along line 9—9 of FIG. 7.

Referring to the drawings, which show the practical embodiments of the invention, 10 designates a square having a main arm or leg 11 and a minor or leg 12 disposed in right angular relation thereto.

The major or main leg or arm 11 is formed with a longitudinal slot 13, which extends from a point spaced inwardly from the outer end of the leg or arm to a point outwardly of the inner ruling edge 14 of the minor leg or arm 12.

The minor leg or arm 12 is formed with a longitudinal slot 15 which extends from a point outwardly of the inner ruling edge 16 of the main leg or arm 11, to a point inwardly of the end edge 17 of the minor leg or arm 12.

The blade or leg 11 is formed with flat longitudinal shoulders 18 and 19 disposed on opposite sides of the slot 13 and parallel thereto. The minor leg or arm 12 is also formed with longitudinal shoulders 20 and 21, on opposite sides of the slot 15, and parallel thereto.

A scale bar 22 is disposed across the legs 11 and 12, and this scale bar is formed with longitudinal slots 23 and 24, which extend from opposite sides of the center of the scale bar to points near the opposite ends of the scale bar. The scale bar 22 is also formed with longitudinal shoulders 25 and 26, adajacent and parallel to the slot 23, and with longitudinal shoulders 27 and 28, adjacent and parallel to the slot 24.

A screw 29 is extended through the slot 23 of the scale and the slot 13 of the main leg or arm 11. This screw is provided with a head 30 having flat side faces 30$^a$, which sidably engage the shoulders 18 and 19 of the main blade 11. On the screw, a washer 31 is disposed having parallel flat side faces 31$^a$ which engage the shoulders 25 and 26 of the scale bar 22. A nut 32 is threaded on the screw 29 and is provided with a concentric socket 29$^a$, in which the compression spring 29$^b$ is enclosed.

By tightening the nut 32, the scale blade 22 will be clamped against the main leg 11 of the square 10, in any position of adjustment. When the spring is compressed by the tightening of the nut, a pressure in addition to that developed by the tightening of the nut on the screw will serve to hold the scale blade against sliding on the leg of the square.

The scale blade is also clamped against the minor leg 12 by means of a screw 29', similar to the screw 29, and by means of a nut and washer set engaging the screw, similar to the nut 32 and washer 31, the nut being also provided with a compression spring. The screw 29' is extended through the longitudinal slot 24 of the scale bar and the longitudinal slot 15 of the minor leg or arm 12.

It is apparent by releasing the nuts of the screws 29 and 29', the scale blade may be shifted to various positions on the legs of the square 10, so that almost any required angle may be established by the scale blade on the square.

The main leg or arm 11 of the square is provided on one face with a scale 35, which is divided into inches and into divisions of eight spaces for each inch, representing eighths of an inch. On the opposite side of the same face, the main leg 11 is provided with a scale 36, divided into inches and twelfths of an inch.

The face of the minor leg on the same side of the square 10 is provided with a scale 37 divided into inches and subdivisions of one-quarter thereof, representing spaces of one-fourth of an inch along both edges of the leg. The opposite faces of both legs are similarly provided with a scale 38, divided into inches and subdivisions of one-twelfth of an inch and a scale 38ª divided into inches and subdivisions of one-eighth of an inch.

One side of the scale bar 22 is provided with a scale 43, divided into spaces of one-twelfth of an inch and finer subdivisions thereof, and on the opposite edge portion of the opposite half, a scale 44 is provided, which is divided into one-sixteenth of an inch. These scales 43 and 44 extend the full length of the scale bar 22.

The opposite side of the scale blade is provided with a longitudinal scale 39 which is divided into spaces of one-eighth of an inch and these spaces are numbered in groups, so that the total number of spaces from either end of the scale may be readily determined. Directly opposite this scale on the scale bar is a scale 40 which is divided into three thirty-seconds of an inch, and the spaces are similarly indexed by groups, so that the total number of spaces may be determined at any point, without total counting of all spaces.

These scales 39 and 40 are disposed on one-half of one side of one face of the scale bar 22. The other half of the same side is provided with a scale 41 which is divided into spaces of one-quarter of an inch, and these spaces are indexed in groups to save counting. Parallel to the scale 41, another scale 42 is arranged on the same half of the same face of the scale bar which is divided into three-sixteenths of an inch. On the other half of the same face of the scale bar are four additional scales 44, 45, 46 and 47. On the edge with scales 39 and 41 is scale 45 which is divided into spaces of three-eighths of an inch. Further along this same edge at the very end of the bar 22 (the end opposite to scale 39) is scale 47 which is divided into three-quarters of an inch. These spaces are indexed in groups to save counting. On the same half of the same face of the scale bar 22 but on a parallelly opposite edge to scales 45 and 47 is scale 46 which is divided into tenths of an inch all along one half of one edge of the scale bar 22, and the spaces are indexed by groups, so that the total number of spaces may be determined at any point without total counting of all spaces.

The double adjustment of the scale bar on the legs of the square may be controlled by the skillful use of the different scales.

To adjust the tool to lay out a flight of stairs, the scale bar is clamped to show the rise of each stair step and the scale bar, by its position on the square, establishes the edge of the stringer. By repeating the operation, all of the steps of a stair may be marked accurately in advance of saw cutting of the lumber.

This invention will provide a better tool for carpenters and builders, and by saving time and labor, will help to promote low cost and better construction of homes and buildings.

Referring now to FIGS. 7–9, there is shown a modified form of the present invention, 10 again designating a square having a main arm or leg 11 and a minor arm or leg 12, disposed in right angular relation thereto.

Here, however, the arm 11 is separable from the arm 12 and is secured thereto by means of a hinge 48 rigidly secured to both arms by means of screws 49. This hinge 48 permits the arm 11 to be conveniently folded under the arm 12 in the direction of the arrow 11ª, shown in FIG. 7, once the nut 54 and screw 29, have been removed. The scale bar 22 may then also be conveniently rotated back upon the leg 12 in the direction of the arrow 22ª, shown in FIG. 7, to provide a compact, portable unit which will take up a minimum of space in the carpenter's pocket.

In all other respects, the square here shown, is similar in structure and operation to the first form shown.

Here again a scale bar 22 is disposed across the legs 11 and 12, and this scale bar is similarly formed with longitudinal slots 23 and 24, which extend from opposite sides of the center of the scale bar to points near the opposite ends of the scale bar. The scale bar 22 is also formed with the inner longitudinal shoulders 25 and 26, adjacent and parallel to the slot 23 and further with outer longitudinal shoulders 50 and 51 also adjacent and parallel to the slot 23. The scale bar 22 is also formed with the inner longitudinal shoulders 27 and 28, adjacent and parallel to the slot 24 and further, with outer longitudinal shoulders 52 and 53 also adjacent and parallel to the slot 24.

A shortened screw 29 is again extended through the slot 23 of the scale and the slot 13 of the main arm or leg 11. This screw is again provided with a head 30 having flat side faces 30ª, which slidably engage the shoulders 18 and 19 of the main blade 11. On the screw, a washer 31 is disposed having the same parallel flat side faces 31ª which engage the shoulders 25 and 26 of the scale bar 22. A modified nut 54 is threaded on the screw 29 and has the same concentric socket 29ª, in which the compression spring 29ᵇ is enclosed, the outer shoulders 50 and 51 of the scale bar 22 being adapted to receive the nut 54 in the manner shown in FIG. 9, with the outer face of the nut being flush with the upper surface of the scale bar 22. The outer face of the nut 54 is here provided with an annular recess 55 adapted to be engaged by the fingers for tightening and untightening purposes.

The operation of the nut 54 is similar to that of the nut 32, except that the nut 54 has the advantage of lying flush with the outer surface of the scale bar 22.

The scale blade is also clamped against the minor leg 12 by means of a screw 29', similar to the screw 29, and by means of a nut and washer set engaging the screw, similar to the nut 54 and washer 31, the nut also being provided with a compression spring.

It should now be apparent that there has been provided a collapsible square with longitudinal slots in the angular arms thereof, a rule having a longitudinal slot on opposite sides of the center thereof, and removable clamping screws for securing the rule in various angular positions on the arms of the square, one of said angular arms being foldable under the other and the rule being rotatable back upon one of said angular arms whereby to provide a compact, portable unit. It should also be apparent that there has been provided a scale and rule of the above type having a nut threaded on each screw to clamp the same and which is provided with a coil spring for maintaining a variable friction pressure against the engaging scale and square, the scale being provided with outer shoulders to receive the nut whereby to permit the outer face of the nut to be flush with the outer surface of the scale.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A carpenter's square having right angular legs each of which is formed with a longitudinal slot equal in length to the inner ruling edge thereof, said legs having an inch scale on each side thereof, said inch scales being subdivided by fractional divisions of an inch each different from the other, and a scale bar having longitudinal slots spaced from each other disposed in diagonal relation to the legs of the square, one side of the scale bar having inch scales divided into sixteenths of an inch and into twelfths of an inch and the other side of the scale bar having scales divided into spaces of eighths of an inch, three thirty-seconds of an inch, tenths of an inch, and three-eighths of an inch, and being usable on the square with either scaled face thereof exposed outwardly of the square, screws extending through the crossing slots of the scale bar and the legs of the square and having heads which slidably interlock with the legs of the square to prevent turning of the screws, washers on the screws which slidably interlock with the scale bar, and a nut threaded on each screw to clamp the scale bar to the square in various positions to establish construction angles, each nut having a socket and a compression spring enclosed by the socket which engages the scale bar and which is compressed by the tightening of the nut to establish a constant pressure on the scale bar and square, said legs being separable and connected to each other at substantially right angles by a corner hinge pivoting one of said legs to be folded under the other of said legs when the square is not in use, each nut having an annular recess on its outer face, said nuts being sufficiently long relative to the depth of the slot to permit manual adjustment thereof.

References Cited in the file of this patent

UNITED STATES PATENTS

| | | |
|---|---|---|
| 614,259 | Bouldry | Nov. 15, 1898 |
| 735,201 | Blandin | Aug. 4, 1903 |
| 854,853 | Spellman | May 18, 1907 |
| 1,060,634 | Rosen | May 6, 1913 |
| 1,178,156 | Harth et al. | Apr. 4, 1916 |
| 1,394,323 | Matson | Oct. 18, 1921 |
| 1,416,652 | Laubenheimer | May 16, 1922 |
| 1,849,128 | Wood | Mar. 15, 1932 |

FOREIGN PATENTS

| | | |
|---|---|---|
| 108,128 | Australia | Aug. 10, 1939 |